United States Patent [19]
Dichter et al.

[11] Patent Number: 5,359,436
[45] Date of Patent: Oct. 25, 1994

[54] BLACK RECALCULATION FOR ARBITRARY HSL CORRECTIONS IN CMY COLOR SPACE

[75] Inventors: Wilhelm Dichter, Tewksbury, Mass.; Eggert Jung, Schönberg, Fed. Rep. of Germany

[73] Assignee: Linotype-Hell AG, Eschborn, Fed. Rep. of Germany

[21] Appl. No.: 974,528

[22] Filed: Nov. 12, 1992

[51] Int. Cl.$^5$ ............................................... H04N 1/46
[52] U.S. Cl. ........................... 358/500; 358/529; 358/520
[58] Field of Search ............... 358/520, 522, 529, 500; 382/54

[56] References Cited

U.S. PATENT DOCUMENTS 3,758,707 9/1973 Keller et al. .................... 178/5.2 A

OTHER PUBLICATIONS

"Principles of color reproduction applied to photomechanical reproduction, color photography, and the ink, paper, and other related industries", by J. A. C. Yule, John Wiley & Sons, Inc., pp. 282-304.

Pocket Guide to Color Reproduction Communication & Control by Miles Southworth, 1979, pp. 12 and 41-44.

Combi-Chromagraph CT 288 of Dr.-Ing. Rudolf Hell, Jul. 1968, pp. 14 and 52.

*Primary Examiner*—Edward L. Coles, Sr.
*Assistant Examiner*—Thomas L. Stoll
*Attorney, Agent, or Firm*—Hill, Steadman & Simpson

[57] ABSTRACT

A method for defining a new value of K (black) corresponding with a change in CMY components. Original CMYK printing colors are provided. The original CMY printing colors are corrected to create new CMY printing colors. A value of a smallest one of the original CMY colors is sensed. A value of a smallest one of the new CMY colors is sensed. By use of each of these smallest values, the original K printing color value is modified to create a recalculated K printing color value. The recalculated black value corrects for distortion of original gray balance.

7 Claims, 2 Drawing Sheets (CMY)$_{ORIGINAL}$ → SATURATION CHANGE → (CMY)$_{NEW}$ (CMY)$_{ORIGINAL}$ → LUMINANCE CHANGE → (CMY)$_{NEW}$

BLACK RECALCULATION FOR ARBITRARY HSL CORRECTIONS IN CMY COLOR SPACE

RELATED APPLICATION

The present application is related to my copending application, Hill Case No. P-92,1545 titled "HSL CORRECTIONS IN CMY COLOR SPACE".

BACKGROUND OF THE INVENTION

This patent describes color manipulation for digital image processing in the prepress industry.

As a result of attempts to introduce more intuitive color manipulation, HSL (Hue, Saturation, Luminance) changes are executed in three steps. In the first step, the original image is translated from the printable CMY color space to the HSL (or equivalent) color space, which is unprintable, but which is convenient for manipulation. In the second step, the HSL changes are applied according to a binary mask and are executed in the new color space. In the third step, the new image is translated back to the printable color space. The original black remains unchanged in such color manipulation.

$(CMY)_{original} \rightarrow$ color space translation $\rightarrow [HSL($ or equivalent$)]_{original}$ $[HSL($ or equivalent$)]_{original} \rightarrow$ HSLchange $\rightarrow [HSL($ or equivalent$)]_{new}$ $[HSL($ or equivalent$)]_{new} \rightarrow$ color space translation $\rightarrow (CMY)_{new}$ In this approach it is difficult to: 1) accomplish quality translations between color spaces; 2) meet precision requirements; 3) decide how to treat unprintable colors; 4) achieve interactive performance; 5) avoid the undesirable effects of binary weighting; and 6) not distort the original gray balance.

SUMMARY OF THE INVENTION

It is an object of the invention to solve the above identified problems, and particularly not to distort the original gray balance.

According to the method of the invention, a new value of K (black) is defined corresponding with a change in CMY components. Original CMYK printing colors are provided. The original CMY printing colors are corrected to create new CMY printing colors. A value of the smallest one of the original CMY colors is sensed. A value of a smallest one of the new CMY colors is sensed. By use of each of these two smallest values, the original K printing color value is modified to create a recalculated K printing color value.

Color manipulation is simpler and more natural when done by hue, saturation and luminance adjustments. The restoration of the gray balance is intuitively expected. The hue, saturation and luminance changes are executed in one step without the color space translations. The restoration of the black balance is based on the original CMYK image combined with the CMY changes applied to it during the color manipulation.

Hue, saturation, and luminance changes are applied directly to the CMY colors and are executed smoothly in the CMY color space according to a weighted mask. After the CMY color manipulation, the new black component is created to restore the gray balance of the original image. The image remains always in the same printable CMYK color space.

All calculations are based on the original CMYK image and are executed on a pixel by pixel basis with respect to the nonlinear gray line rather than to the color cube diagonal (the gray line has no color, but represents changing luminance). The gray line extends nonlinearly through the CMY color space. Both original and new images are maintained in the printable CMY color space.

After the CMY color manipulation, the new black component is created to restore the gray balance of the original image. The image always remains in the same printable CMYK color space.

The restoration of the gray balance is based on the original CMYK image combined with the CMY changes applied to it during the color manipulation. The new black calculation is executed in one step and is performed on a pixel by pixel basis. Both original and new images remain in the printable CMYK color space.

K treatment for arbitrary CMY changes is provided. The following change, applied directly to CMY colors and executed in the CMY color space during the color manipulation, is given:

$(CMY)_{original} \rightarrow$ color manipulation $\rightarrow (CMY)_{new}$

The new black component is created from the original black combined with the skeleton black gradation functions of the CMY components before and after the color manipulation.

$K_{original} \rightarrow$ new black creation $\rightarrow K_{new}$

DESCRIPTION OF THE PREFERRED EMBODIMENTS

Figure 1:
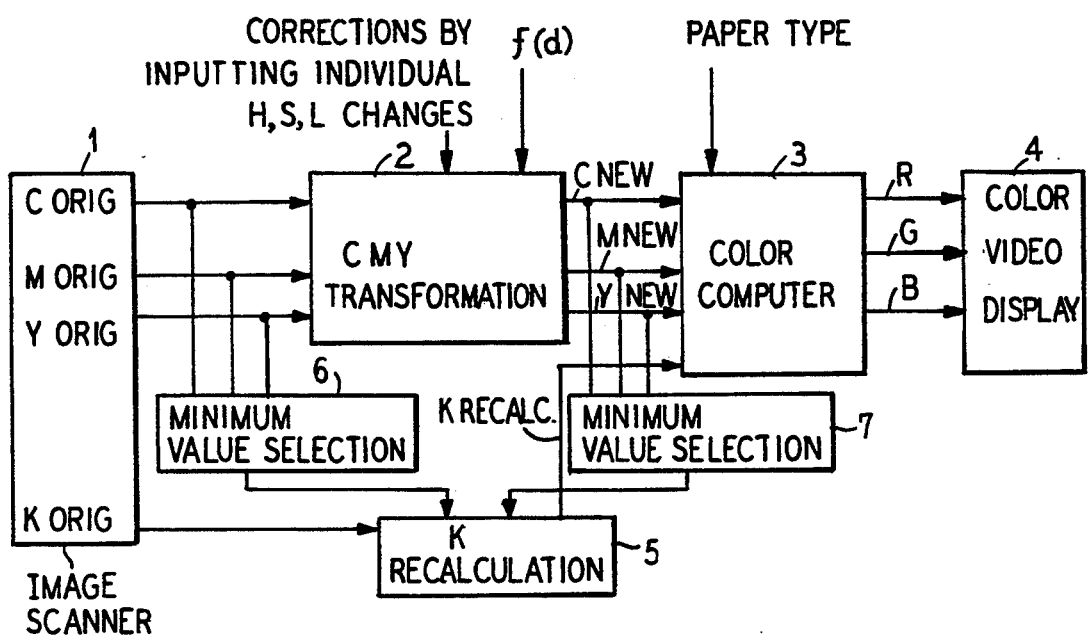
FIG. 1 is a block diagram showing the method of the invention for defining a new value of K corresponding with a change in CMY components.

The K recalculation method according to the invention is most easily understood as shown by the block diagram in FIG. 1. An image scanner creates original values $C_{orig}$, $M_{orig}$, $Y_{orig}$, and $K_{orig}$. The image scanner 1 creates these color values by scanning an original image. The color values are then input into a CMY transformation 2 where new color values $C_{new}$, $M_{new}$, and $Y_{new}$ are created based on HSL changes input into the CMY transformation 2. A masking function f(d) is also input. The new color values $C_{new}$, $N_{new}$, and $Y_{new}$ are then input into color computer 3 which converts these colors to RGB video signals for input to a color video display 4. Paper type can also be input into the color computer. The above was described in greater detail in my copending patent application, Hill Case No. P-92,1545, titled "HSL CORRECTIONS IN CMY COLOR SPACE" and incorporated herein by reference. According to the present invention, the black value $K_{orig}$ is input into a K recalculation 5. The minimum value selection 6 selects the smallest of the three values $C_{orig}$, $M_{orig}$, and $Y_{orig}$. The minimum value selection 7 also selects the smallest of the new color values $C_{new}$, $M_{new}$ and $Y_{new}$. These two minimum values are then input into the K recalculation 5 which then recalculates the K and outputs K. The HSL changes and K treatment shall now be described in greater detail.

Hue Change

Figure 2:
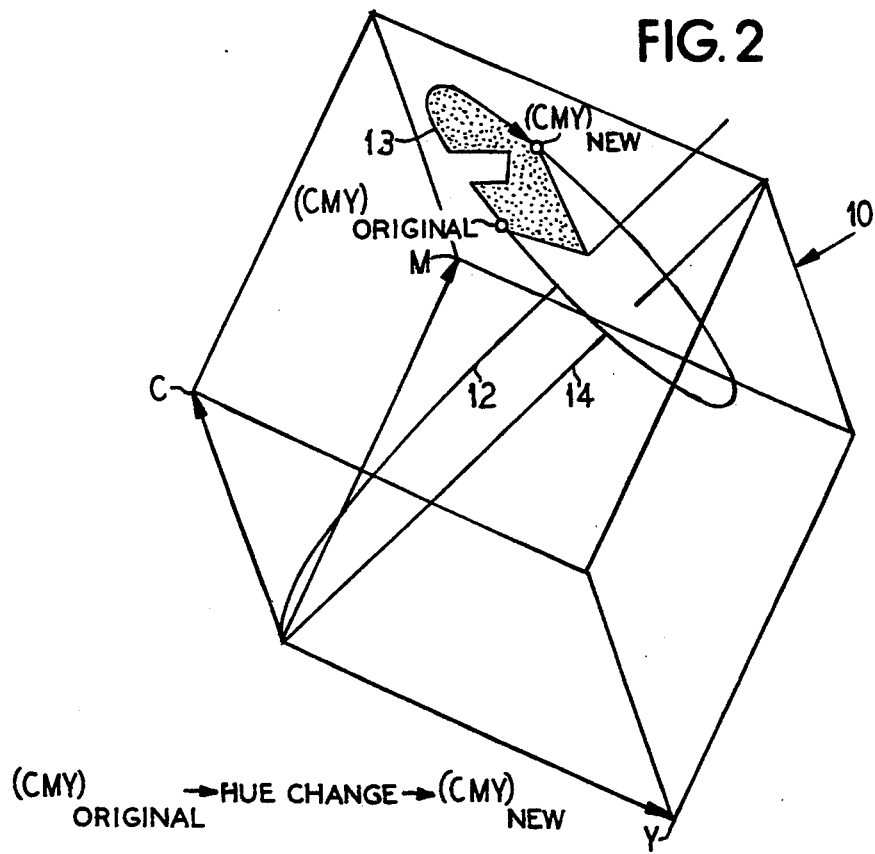
FIG. 2 is an illustration of a CMY color space showing hue change.

As shown in FIG. 2, each hue change is applied directly to the CMY colors and is executed in the CMY color space 10. The original color rotates in its luminance plane 13 (:perpendicular to the color cube diagonal 14) around the intersection of this plane with the gray line 12 (the gray line represents absence of color but increasing luminance):

$$(CMY)_{original} \rightarrow \text{hue change} \rightarrow (CMY)_{new}$$

A maximum desired hue change is described as:

$$-180° \leq CHANGE \leq 180°$$

Input data consists of: 1) the image as an array of pixels, with the $(CMY)_{original}$ color components specified for each pixel; and 2) an optional weighting mask as an array of pixels, with a percentage of the maximum desired change specified for each pixel:

$$0 \leq d \leq 100\% \text{ (for a global change } d=100\%).$$

For each pixel of the image, the following five steps are carried out:

1. Two change coefficients are calculated according to the maximum desired hue change and an arbitrary function of the optional weight:

$$COEFF_1 = \cos[f(d)CHANGE] \text{ and } COEFF_2 = \frac{\sqrt{3}}{3}\sin[f(d)CHANGE]$$

2. The intersection of the color cube diagonal with a luminance plane perpendicular to it is calculated as:

$$D = 1/3(Y_{original} + M_{original} + C_{original})$$

3. The intersection of the gray line with a luminance plane is calculated as the empirically established function of the color cube diagonal intersection with the same plane:

$$Y_{gray} = f_Y(D), M_{gray} = f_M(D) \text{ and } C_{gray} = f_C(D)$$

4. New color components (after the hue change) are calculated as:

$$Y_{new} = COEFF_1(Y_{original} - Y_{gray}) + COEFF_2 \cdot (M_{original} - M_{gray} - C_{original} + C_{gray}) + Y_{gray}$$

$$M_{new} = COEFF_1(M_{original} - M_{gray}) + COEFF_2 \cdot (C_{original} - C_{gray} - Y_{original} + Y_{gray}) + M_{gray}$$

$$C_{new} = COEFF_1(C_{original} - C_{gray}) + COEFF_2(Y_{original} - Y_{gray} - M_{original} + M_{gray}) + C_{gray}$$

5. The new color components can be clamped between the color limits of the available CMY color space and/or are subjected to the saturation adjustment which preserves the desired hue and luminance values for $0 \leq C_{gray} \leq C_{max}$;

$$C_{new,corr} = COEFF(C_{new} - C_{gray}) + C_{gray}$$

$$M_{new,corr} = COEFF(M_{new} - M_{gray}) + M_{gray}$$

$$Y_{new,corr} = COEFF(Y_{new} - Y_{gray}) + Y_{gray}$$

where COEFF is the smallest of:

$$\frac{C_{limit} - C_{gray}}{C_{new} - C_{gray}}, \frac{M_{limit} - M_{gray}}{M_{new} - M_{gray}} \text{ and } \frac{Y_{limit} - Y_{gray}}{Y_{new} - Y_{gray}}$$

where $COLOR_{limit} = 0$ for $COLOR_{new} < 0$ $COLOR_{limit} = COLOR_{max}$ for $COLOR_{new} > COLOR_{max}$ $COLOR_{limit} = COLOR_{new}$ 6. The empirically established skeleton black gradation function for the smallest of the original CMY color components is calculated as:

$$SB_{original} = f_{skeleton\ black}(\text{smallest of } Y_{original}^*, M_{original}, C_{original})$$

7. The empirically established skeleton black gradation function for the smallest of the new CMY color components is calculated as:

$$SB_{new} = f_{skeleton\ black}(\text{smallest of } Y_{new,corr}, M_{new,corr}, C_{new,corr})$$

8. The new black component is calculated as:

$$K_{new} = K_{original} - SB_{original} + SB_{new}$$

Saturation Change

Figure 3:
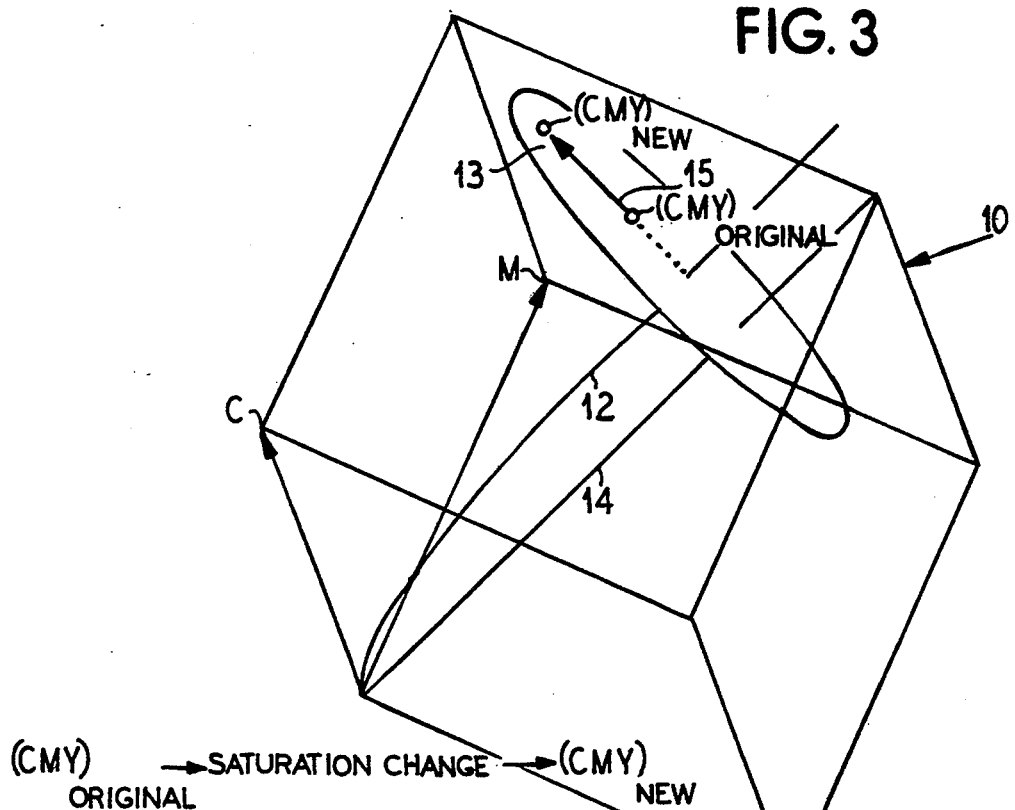
FIG. 3 is an illustration of a CMY color space showing saturation change.

As shown in FIG. 3, each saturation change is applied directly to the CMY colors and is executed in the CMY color space 10. The original color moves along the line 15 which connects this color to the intersection of its luminance plane with the gray line 12. Decreases and increases in saturation are achieved by moving to and from this intersection, respectively:

$$(CMY)_{original} \rightarrow \text{saturation change} \rightarrow (CMY)_{new}$$

A maximum desired saturation change is described as a percentage of the actual saturation: $0 \leq CHANGE \leq 1$ for saturation decrease and $1 < CHANGE$ for saturation increase. The input data consists of: 1) the image as an array of pixels, with the $(CMY)_{original}$ color components specified for each pixel; and 2) an optional weighting mask as an array of pixels, with a percentage of the maximum desired change specified for each pixel: $0 < d < 100\%$ (for a global change $d = 100\%$).

For each pixel of the image, the following five steps are carried out:

1. The change coefficient is calculated according to the maximum desired saturation change and an arbitrary function of the optional weight:

$$COEFF = 1 + f(d)CHANGE$$

2. The intersection of the color cube diagonal with a luminance plane perpendicular to it is calculated as:

$$D = 1/3(Y_{original} + M_{original} + C_{original})$$

3. The intersection of the gray line with a luminance plane is calculated as the empirically established function of the color cube diagonal intersection with the same plane:

$$Y_{gray} = f_Y(D), M_{gray} = f_M(D) \text{ and } C_{gray} = f_C(D)$$

4. New color components (after the saturation change) are calculated as:

$$Y_{new} = COEFF(Y_{original} - Y_{gray}) + Y_{gray}$$

$$M_{new} = COEFF(M_{original} - M_{gray}) + M_{gray}$$

$$C_{new} = COEFF(C_{original} - C_{gray}) + C_{gray}$$

5. The new color components can be clamped between the color limits of the available CMY color space and/or subjected to the saturation adjustment which preserves the desired hue and luminance values for $0 \leq C_{gray} \leq C_{max}$;

$$C_{new,corr} = COEFF(C_{new} - C_{gray}) + C_{gray}$$

$$M_{new,corr} = COEFF(M_{new} - M_{gray}) + M_{gray}$$

$$Y_{new,corr} = COEFF(Y_{new} - Y_{gray}) + Y_{gray}$$

where COEFF is the smallest of:

$$\frac{C_{limit} - C_{gray}}{C_{new} - C_{gray}}, \frac{M_{limit} - M_{gray}}{M_{new} - M_{gray}} \text{ and } \frac{Y_{limit} - Y_{gray}}{Y_{new} - Y_{gray}}$$

where $COLOR_{limit} = 0$ for $COLOR_{new} < 0$ $COLOR_{limit} = COLOR_{max}$ for $COLOR_{new} > COLOR_{max}$ $COLOR_{limit} = COLOR_{new}$ 6. The empirically established skeleton black gradation function for the smallest of the new CMY color components is calculated as:

$$SB_{original} = f_{skeleton\ black}(\text{smallest of } Y_{original}, M_{original}, C_{original})$$

7. The empirically established skeleton black gradation function for the smallest of the new CMY color components is calculated as:

$$SB_{new} = f_{skeleton\ black}(\text{smallest of } Y_{new,corr}, M_{new,corr}, C_{new,corr})$$

8. The new black component is calculated as:

$$K_{new} = K_{original} - SB_{original} + SB_{new}$$

Luminance Change

Figure 4:
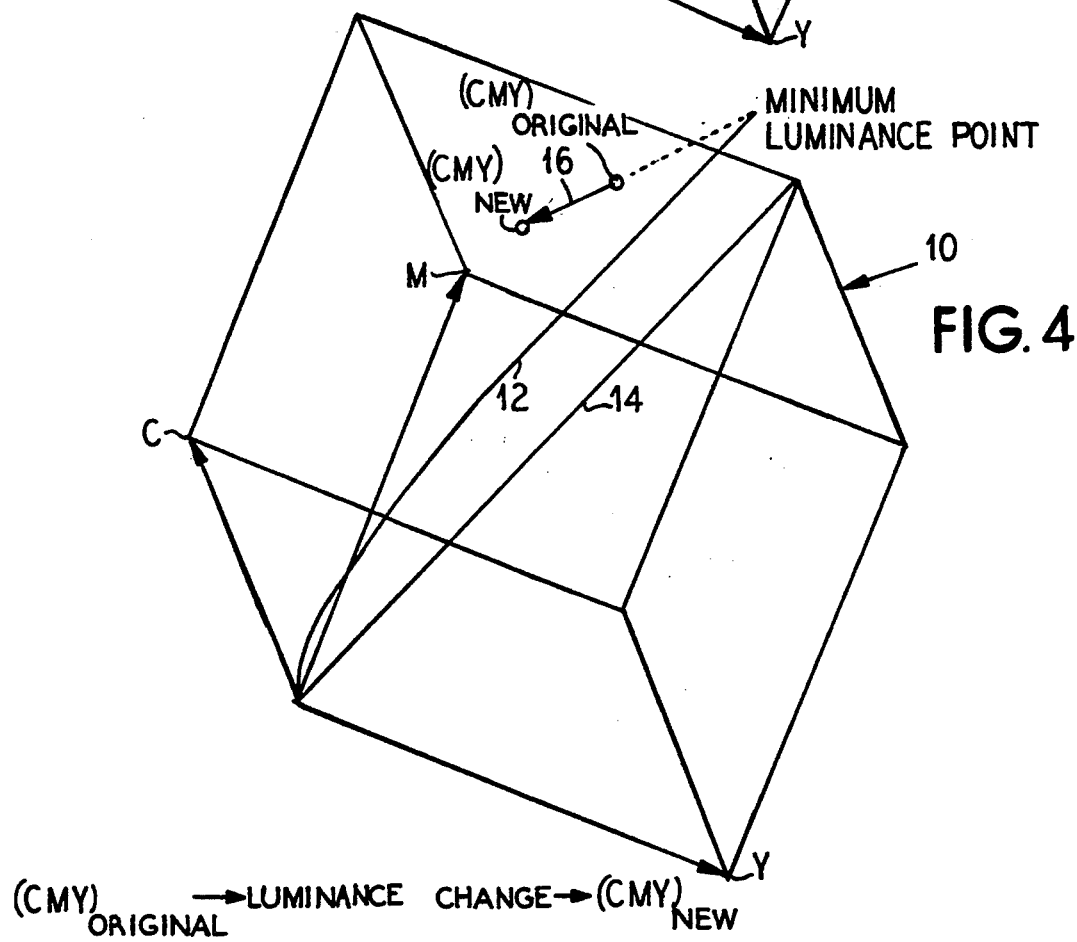
FIG. 4 is an illustration of a CMY color space showing luminance change.

As shown in FIG. 4, each luminance change is applied directly to the CMY colors and is executed in the CMY color space 10. The original color moves along the line 16 which connects this color to the point of minimum luminance on the gray line 12. Decreases and increases in luminance are achieved by moving to and from this point, respectively:

$$(CMY)_{original} \rightarrow \text{luminance change} \rightarrow (CMY)_{new}$$

A maximum desired luminance change is described as a percentage of the actual luminance: $0 \leq CHANGE \leq 1$ for luminance decrease and $1 \leq CHANGE$ for luminance increase.

The input data consists of: 1) the image as an array of pixels, with the $(CMY)_{original}$ color components specified for each pixel; and 2) an optional weighting mask as an array of pixels, with a percentage of the maximum desired change specified for each pixel: $0 \leq d \leq 100\%$ (for a global change $d = 100\%$).

For each pixel of the image, the following five steps are carried out:

1. The change coefficient is calculated according to the maximum desired luminance change and an arbitrary function of the optional weight:

$$COEFF = 1 + f(d) \ CHANGE$$

2. The intersection of the color cube diagonal with the largest color luminance plane is calculated as:

$$D_{max} = 1/3(Y_{max} + M_{max} + C_{max})$$

3. The point of minimum luminance on the gray line is described as:

$$Y_{gray,max} = f_Y(D_{max}), M_{gray,max} = f_M(D_{max}) \text{ and } C_{gray,max} = f_C(D_{max})$$

4. New color components (after the luminance change) are calculated as:

$$Y_{new} = COEFF(Y_{original} - Y_{gray,max}) + Y_{gray,max}$$

$$M_{new} = COEFF(M_{original} - M_{gray,max}) + M_{gray,max}$$

$$C_{new} = COEFF(C_{original} - C_{gray,max}) + C_{gray,max}$$

5. The new color components can be clamped between the color limits of the available CMY color space and/or is subjected to the saturation adjustment which preserves the desired hue and luminance values for $0 \leq C_{gray} \leq C_{max}$;

$$C_{new,corr} = COEFF(C_{new} - C_{gray,new}) + C_{gray,new}$$

$$M_{new,corr} = COEFF(M_{new} - M_{gray,new}) + M_{gray,new}$$

$$Y_{new,corr} = COEFF(Y_{new} - Y_{gray,new}) + Y_{gray,new}$$

where COEFF is the smallest of:

$$\frac{C_{limit} - C_{gray}}{C_{new} - C_{gray}}, \frac{M_{limit} - M_{gray}}{M_{new} - M_{gray}} \text{ and } \frac{Y_{limit} - Y_{gray}}{Y_{new} - Y_{gray}}$$

where:

$COLOR_{limit} = 0$ for $COLOR_{new} < 0$ $COLOR_{limit} = COLOR_{max}$ for $COLOR_{new} > COLOR_{max}$ $$COLOR_{limit} = COLOR_{new}$$

The intersection of the color cube diagonal with the new color luminance plane is calculated as:

$$D_{new} = 1/3(Y_{new} + M_{new} C_{new})$$

The intersection of the gray line with the new color luminance plane is calculated as the empirically established function of the color cube diagonal intersection with the same plane:

$$Y_{gray,new} = f_Y(D_{new}), M_{gray,new} = f_M(D_{new}) \text{ and } C_{gray,new} = f_C(D_{new})$$

6. The empirically established skeleton black gradation function for the smallest of the original CMY color components is calculated as:

$$SB_{original} = f_{skeleton\ black}(\text{smallest of } Y_{original}, M_{original}, C_{original})$$

7. The empirically established skeleton black gradation function for the smallest of the new CMY color components is calculated as:

$$SB_{new} = f_{skeleton\ black}(\text{smallest of } Y_{new,corr}, M_{new,corr}, C_{new,corr})$$

8. The new black component is calculated as:

Creation of Black Component

For each of the above hue, saturation and luminance changes, as shown in FIG. 1, the new black component is created from the original black combined with the skeleton black gradation functions of the CMY components before and after the color manipulation:

$$K_{original} \rightarrow \text{new black creation} \rightarrow K_{new}$$

Summarizing, the input data consists of the image as an array of pixels, with the $(CMYK)_{original}$ color components specified for each pixel. For each pixel of the image, the following three steps are carried out:

1. The empirically established skeleton black gradation function for the smallest of the original CMY color components is calculated as:

$$SB_{original} = f_{skeleton\ black}(\text{smallest of } Y_{original}, M_{original}, C_{original})$$

2. The empirically established skeleton black gradation function for the smallest of the new CMY color components is calculated as:

$$SB_{new} = f_{skeleton\ black}(\text{smallest of } Y_{new,corr}, M_{new,corr}, C_{new,corr})$$

3. The new black component is calculated as:

$$K_{new} = K_{original} - SB_{original} + SB_{new}$$

This new black value is clamped between $\phi$ and some max value.

Although various minor changes and modifications might be proposed by those skilled in the art, it will be understood that we wish to include within the claims of the patent warranted hereon all such changes and modifications as reasonably come within our contribution to the art.

We claim:

1. A method for defining a new value of K corresponding with a change in CMY components in a CMY color space for color manipulation in digital image processing so that original gray balance distortion is minimized, comprising the steps of:

providing original CMYK printing colors having an original gray balance and where K is a black value;

correcting the original CMY printing colors to create new CMY printing colors;

sensing a value of a smallest one of the original CMY colors;

sensing a value of a smallest one of the new CMY colors; and by use of each of said smallest values, modifying a value of the original black K printing color to create a recalculated black K printing color value which minimizes distortion of original gray balance.

2. A method according to claim 1 wherein K is modified by:

first defining a gradation function;

applying both of the smallest values to the gradation function to obtain first and second function values, respectively; and from the original black K value subtracting the first value and adding the second value to obtain said recalculated black K printing color value.

3. A method according to claim 2 including the step of providing the recalculated black K value between zero and a predetermined maximum value.

4. A method according to claim 1 wherein said recalculated black K value comprises a correction for distortion of original gray balance.

5. A method according to claim 1 wherein the original CMY printing colors are corrected by inputting HSL changes in a CMY transformation to create said new CMY printing colors.

6. A method according to claim 5 wherein the new CMY printing color values are input to a color computer which when outputs RGB video signals for driving a color video display.

7. A method for defining a new value of K and new values of CMY components corresponding with an HSL color manipulation change in CMY components in digital image processing, comprising the steps of:

providing original CMYK printing colors having an original gray balance;

correcting the original CMY printing colors in a CMY transformation by inputting HSL changes in a transformation to create new CMY printing colors;

sensing a value of a smallest one of the original CMY colors;

sensing a value of a smallest one of the new CMY colors; and by use of each of said smallest values modifying a value of the original K printing color to create a recalculated K printing color value which minimizes distortion of original gray balance.

* * * * *